United States Patent [19]

Inaba et al.

[11] Patent Number: 4,673,975

[45] Date of Patent: Jun. 16, 1987

[54] TELEVISION SIGNAL SCRAMBLING APPARATUS

[75] Inventors: Masao Inaba; Kazuo Kashigi, both of Tokyo, Japan

[73] Assignee: NEC Corporation, Japan

[21] Appl. No.: 669,820

[22] Filed: Nov. 8, 1984

[30] Foreign Application Priority Data

Nov. 9, 1983 [JP] Japan .................................. 58-210349

[51] Int. Cl.⁴ ....................... H04N 7/167; H04N 1/00; H04N 7/16
[52] U.S. Cl. ......................................... 380/14; 380/17
[58] Field of Search ................. 358/119, 114, 122, 123

[56] References Cited

U.S. PATENT DOCUMENTS 4,070,693 1/1978 Shutterly .............................. 358/123
4,458,268 7/1984 Ciciora ................................. 358/119
4,547,802 10/1985 Fogarty et al. ....................... 358/123

FOREIGN PATENT DOCUMENTS 1402458 8/1975 United Kingdom ................ 358/121
8303942 11/1983 United Kingdom ................ 358/114

Primary Examiner—Stephen C. Buczinski
Assistant Examiner—Melissa T. Koltak
Attorney, Agent, or Firm—Ostrolenk, Faber, Gerb & Soffen

[57] ABSTRACT

A scrambling apparatus which scrambles a television signal prior to its transmission to prevent interception of the signal by means other than a counterpart descrambler apparatus. The television signal is scrambled by dividing each scan line (a scan line includes its leading sync portion) into first and second portions which are divided by an intermediate picture element. Each line is transmitted as follows: first the intermediate picture element is transmitted followed by the second scan line portion, followed by the first portion which begins with the sync signal and is terminated by retransmission of the intermediate picture element. The position of the intermediate picture element is randomly changed in each successive scan line so that reconstruction of the original television signal becomes exceedingly difficult. In the descrambler (receiver), a random address generator which includes a read only memory which contains the sequence of the position of the intermediate picture element in successive scan lines is used for receiving the scrambled television signal and descrambling the signal and restoring it to its original form for use in standard television receivers.

11 Claims, 8 Drawing Figures

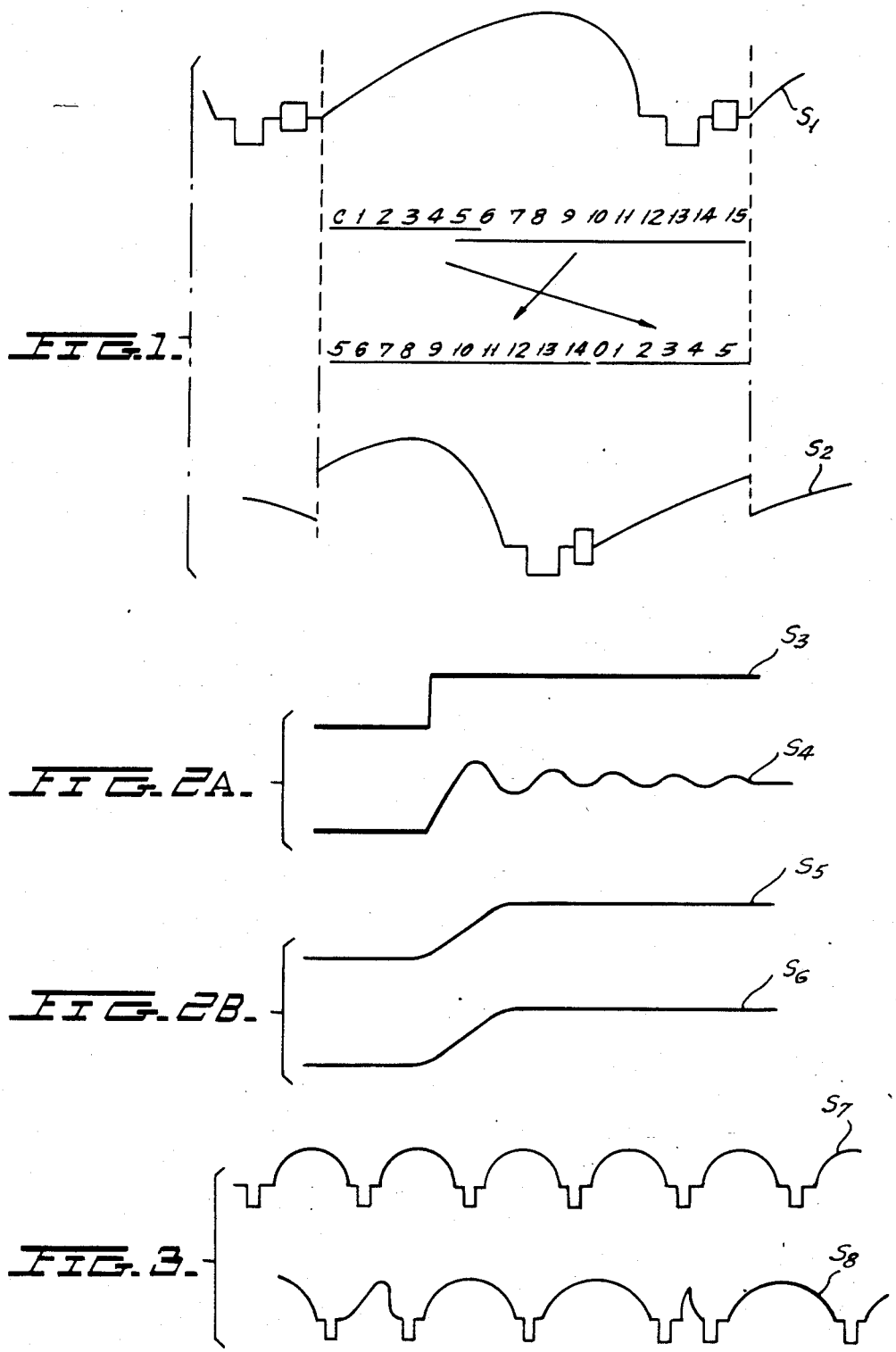

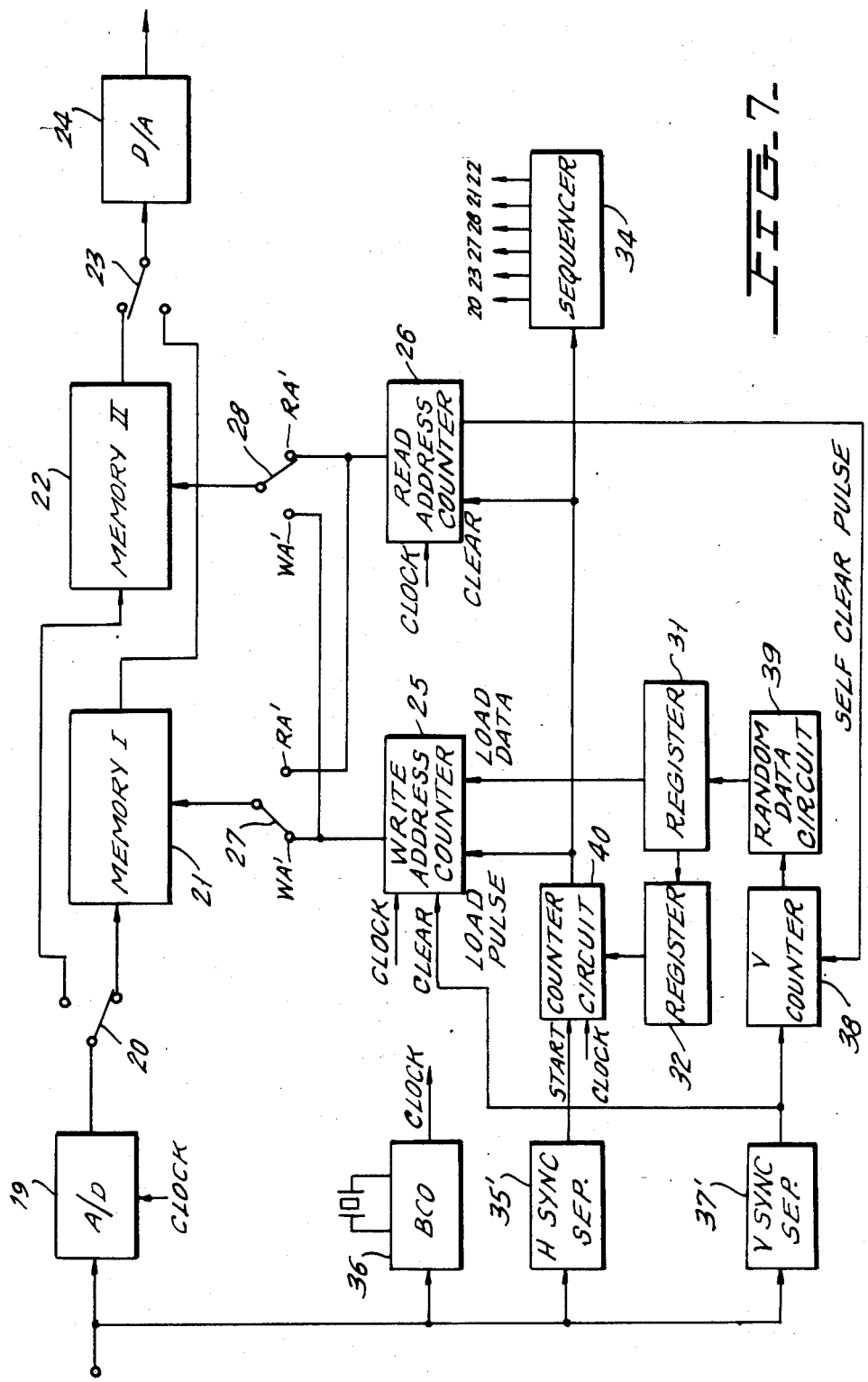

TELEVISION SIGNAL SCRAMBLING APPARATUS

BACKGROUND OF THE INVENTION

The present invention relates to a television signal scrambling apparatus which scrambles a television signal in a so that it may be securely transmitted.

Conventionally, many different methods have been proposed for a scrambling a television signal. One of these is the line rotation method. In this method, as disclosed in U.S. Pat. No. 4,070,693, a horizontal video portion not including the horizontal sync signal and the burst signal is segmented into two parts which are exchanged with each other before their transmission. The segmentation of the horizontal video portion into two parts is accomplished at random for each scanning line.

However, this method has the following disadvantages. First, since a segmented point in the television signal is limited to the video portion, the horizontal sync signal appears at the regular interval even after scrambling and, thus, synchronization can be easily accomplished by an ordinary receiver. As a result, the scrambling effect is not necessarily sufficient. Next, in a scrambled video waveform, a waveform level at the segmented point is abruptly changed from a blanking level (pedestal level) and, thus, a transient error often occurs. As a result, after the demodulated is at the receiver, this an annoying glitch appears on the television screen.

SUMMARY OF THE INVENTION

Accordingly, it is an object of the present invention to provide an apparatus for scrambling a television signal which prevents the synchronization by an ordinary receiver to improve the concealability of the television signal.

Another object of the present invention is to provide an apparatus for scrambling a television signal wherein the segmented point in a television signal does not cause a glitch in the received image.

According to the present invention, there is provided an apparatus for scrambling a television signal comprising: a plurality of memory areas each having a capacity to store the television signal of one horizontal period; a write address counter for producing a write address use for sequentially storing the television signal into the plurality of memory areas; random data generator for generating segment position information; and a read address counter responsive to the segment position information for producing read addresses for sequentially reading out the television signal from the plurality of the memory areas, whereby the reading address starts from an address corresponding to the segment position, passes through addresses corresponding to trailing and leading edges of the horizonyal period and terminates in an address corresponding to the segment position.

BRIEF DESCRIPTION OF THE DRAWINGS

FIG. 1 are charts for which explain a scrambling method according to the present invention;

FIG. 2(A) shows signal waveforms for explaining a conventional scrambling method;

FIG. 2(B) shows signal waveforms according to the present invention;

FIG. 3 shows an input television signal and an output television signal obtained by the scrambling method of the present invention;

FIG. 7 is a modification of the embodiment shown in FIG. 6.

DESCRIPTION OF THE PREFERRED EMBODIMENT

Figure 4:
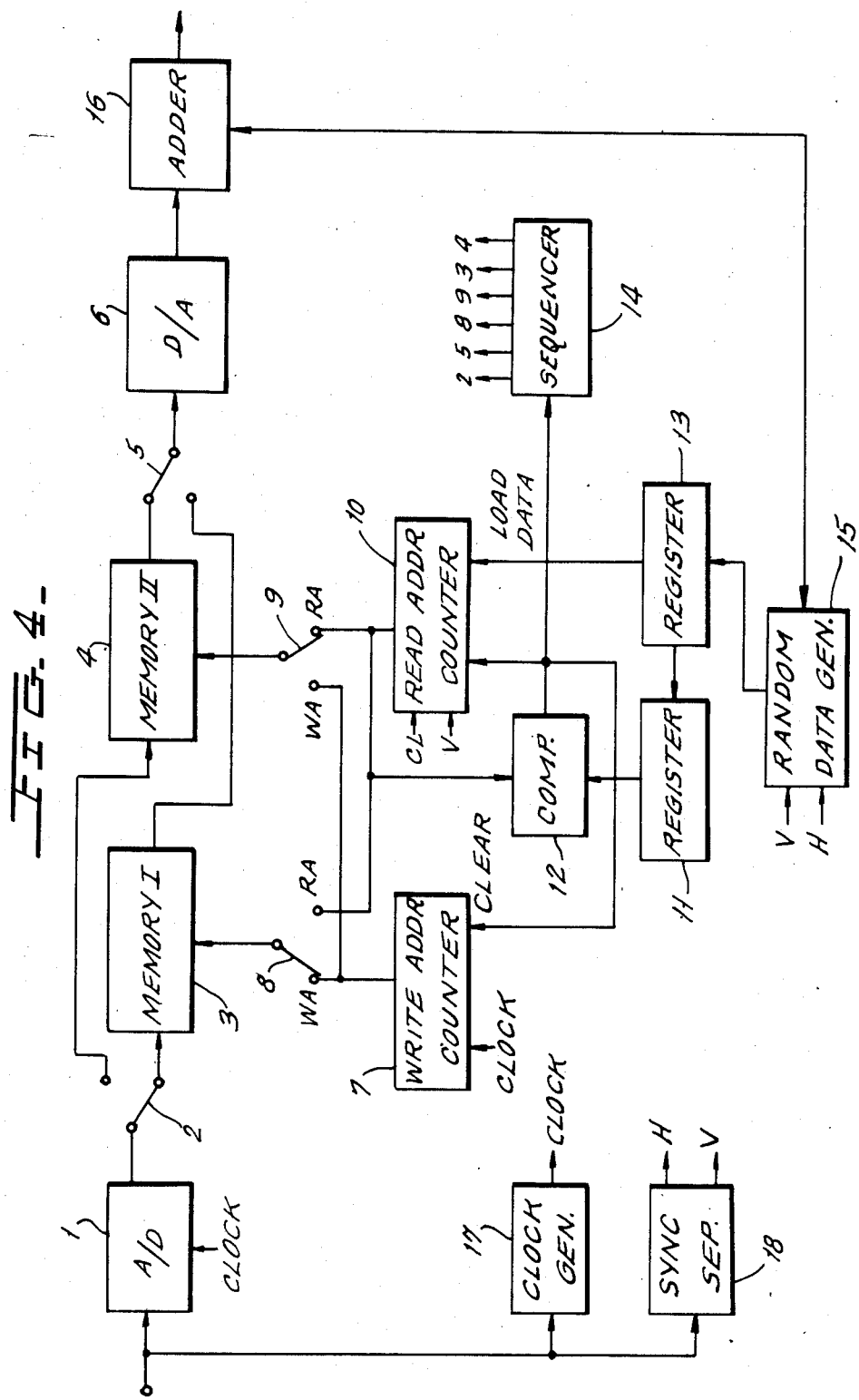
FIG. 4 shows a block diagram of an embodiment of a transmitter according to the present invention.

With reference to FIG. 1 indicating a scrambling method according to the present invention, in an input television signal $S_1$, one horizontal scanning period is corresponds to and extends through the numbers "0" to "15". For example, when the point marked with the number "5" is defined as a segmented point for the line rotation, the portion corresponding to the numbers "5" to "14" are located forward and the portion corresponding to the numbers "0" to "5" are located backward. Consequently, a television signal waveform scrambled by the line rotation becomes the waveform $S_2$. The line rotation method according to the present invention, is characterized in that firstly the line rotation is effected for the full horizontal period including the blanking portion of each line and secondly the point corresponding to the number "5", i.e., the point used for segmentation appears twice in the data, one at the head edge and another time at the trail edge of the scrambled television signal. In the present invention, a part of the number "15" is lost, but the lost part corresponds to an edge of a television screen. Therefore, the effects of the lost data is inconsequential or picture elements is not significant.

Now, it will be explained why the segmented point (the point of the number "5" in FIG. 1) is transmitted twice, one at the head edge and one at the tail edge. In the conventional scrambling method, a sudden rise is experienced by the video signals as it moves from the blanking level to the video signal level at the edges of the video portion in the scrambled video signal. Thus, such a waveform which has an extremely sharp rise time can be directed as the waveform $S_3$ shown FIG. 2(A). When this signal waveform $S_3$ is transmitted via standard television transmission system, the signal waveform becomes the signal including transition errors as shown by the waveform $S_4$. This signal waveform is equivalent to a signal smoothed by a low-pass filter, that is, as is well known, the rise time assumes a definitive value corresponding to the band width of a low-pass filter associated with the transmission system. Further, in accordance with the GIBBS phenomenon, a maximum of 18% overshoot and a ringing follows the rising edge.

In the prior art disclosed in the above-identified U.S. patent, the video signal distorted by such ringing is received with the ringing portion and is not restored to its original form. Contrarily, in accordance with the present invention, the signal level at the segmented point is transmitted at both the leading and trailing edges of one horizontal period, and, thus, such overlap provides a margin for correcting errors in transmission. Therefore, when a signal is transmitted after it is smoothed to have a waveform $S_5$ as shown in FIG. 2(B), waveform distortion does not result and thus there are no disadvantageous phenomena such as inversion in a FM propagation path as a waveform $S_6$. In addition, it is in compliance with radio standards. Furthermore, according to the present invention, since the television signal can be restored by overlapswitching between the same signal levels (to have a period when instant signal levels coincide with each other and to switch within the period) an image error at the juncture does not appear on the restored signal at the television screen.

FIG. 3 shows an input television signal and a scrambled television signal according to the present invention. Namely, a signal waveform $S_7$ denotes the input television video signal and a signal waveform $S_8$ denotes the scrambled television signal. As can be seen from the waveform $S_8$ in FIG. 3, the horizontal sync pulse interval is changed randomly. No conventional method performs such random interval treatment for sync signals and, thus, it is impossible to receive the scrambled television signal without a receiver according to the present invention. Accordingly, this random interval treatment of the horizontal sync signal is the most noteworthy characteristic of the present invention. However, since, as is well known, the vertical blanking period often contains signals such as the vertical interval test signal, network switching cure signal, etc., it is desirable to transmit the television signal corresponding to the vertical blanking period without scrambling.

Referring to FIG. 4 which shows an embodiment of a transmitter according to the present invention, an input television signal is converted into a digital signal by an A/D converter 1 and alternatively supplied through a selector 2 to memories 3 and 4, each having a capacity for storing a television signal of one horizontal period. A digital signal is alternatively read out from the memories 3 and 4 and is supplied, through a selector 5 to a D/A converter 6. A write address counter 7 produces an ordinary write address WA in synchronism with the input television signal. The write address WA delivered from the write address counter 7 is alternatively supplied through selectors 8 and 9 to the memories 3 and 4. A read address counter 10 produces a specific read address RA for scrambling the input television signal. The read address RA delivered from the read address counter 10 is alternatively supplied through the selector 8 and 9 to the memories 3 and 4. As shown in FIG. 4, when the memory 3 receives the write address WA, the memory 4 receives the read address RA, or vice versa.

The operation for producing the read address RA will be explained below. As shown in FIG. 1, the read address RA starts from the segmented point, i.e., "5" in FIG. 1, for example, and increases. In this embodiment, the read address RA reaches "14", which is smaller than an end address "15" by one, it changes to "zero", and, then, proceeds to count until the segmented point "5" is reached. Therefore, the read address counter 10 has a maximum count which is smaller than that of the write address counter 7 by one. In practice, the value "one" or one unit count corresponds to one subcarrier period. Therefore, when a sampling frequency of 14.3 MHz ($4 \times 3.58$ MHz) is employed and the count value of the write address counter 7 is 910 and the count value of the read address counter 10 is 906. The start address, i.e., information of the segmented point for one line is latched into a register 11 and supplied therefrom it to a comparator 12. On the other hand, the start address for the next line is latched into a register 13. Thereafter, the latched value in the register 13 is shifted to the register 11. The comparator 12 compares the read address RA delivered from the read address counter 10 with the start address of the present line. When the read address RA reaches the start address of the present line, the comparator 12 produces a match pulse to indicate that a match has been detected. The match pulse is supplied to the read address counter 10 as a load pulse to load the start address latched in the register 13 into the read address counter 10. The match pulse is also supplied to a sequencer 14 which switches over the selectors 2, 5, 8 and 9, and operations of the memories 3 and 4 between writing and reading modes. The match pulse is further supplied to the write address counter 7 as a clear pulse. A random data generator 15 randomly produces the start address for every line and transmits it to the register 13. The random data generator 15 contains a read only memory (ROM) which stores a plurality of sets of predetermined start addresses. Each set contains series of predetermined start addresses for one television field. Thereafter, the random data generator 15 randomly selects one of the sets every television field and sequentially delivers the series of the start addresses contained in the ROM. Furthermore, the random data generator 15 delivers an identification signal, which indicates the randomly selected set, to an adder 16 where the selected set is coded into the television signal delivered from the D/A converter 6. In FIG. 4, a clock generator 17 and a sync separator 18 are also supplied.

Figure 5:
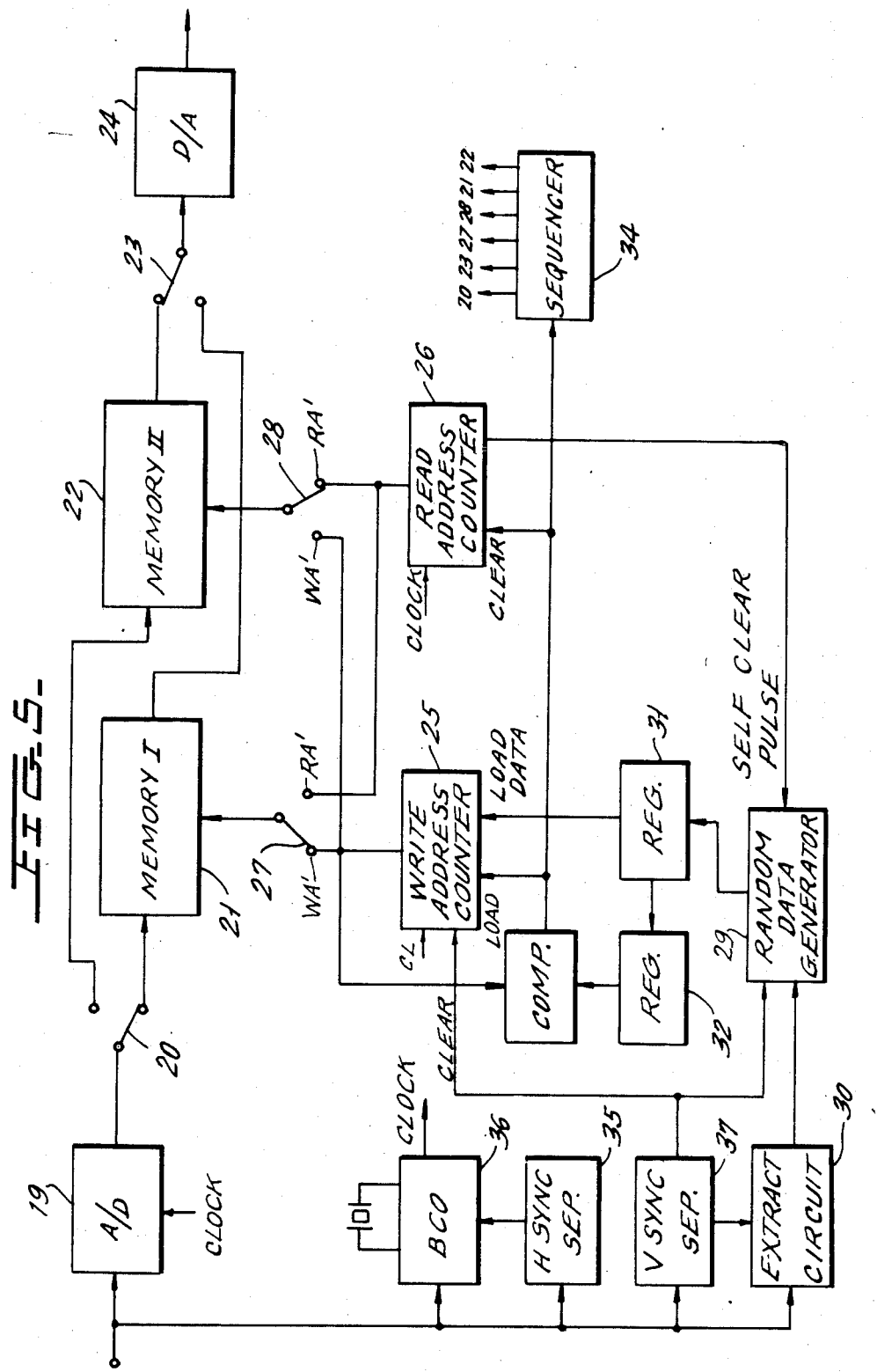
FIG. 5 shows a block diagram of an embodiment of a receiver according to the present invention.

Next with reference to FIG. 5, a receiver for decoding scrambled signals will be explained. In FIG. 5, an input scrambled television signal is supplied to an A/D converter 19 and, then, alternatively transmitted through a selector 20 to memories 21 and 22. A restored television signal alternatively read out from the memories 21 and 22 is supplied through a selector 23 to a D/A converter 24. A write address counter 25 produces specific a write address WA' to restore the input scrambled television signal. A read address counter 26 produces an ordinary read address RA'. The write address WA' and the read address RA' are alternatively supplied to the memories 21 and 22 through selectors 27 and 28. The write address counter 25 in the receiver corresponds to the read address counter 10 of the transmitter shown in FIG. 4. A random data generator 29 also contains a ROM, which stores the same data stored in the ROM contained in the random data generator 15 of the transmitting side. The random data generator 29 receives the identification signal extract by an extracted circuit 30 and generates series of start addresses for every line which are the same as those at the transmitting side. Thereafter, a register 31 latches a start address for a next line and a register 32 latches a start address of the present line. A comparator 33 compares the write address WA' delivered from the write address counter 25 with the start address of the present line from the register 32. When the write address WA' reaches the start address delivered from the register 32, the comparator 33 produces a match pulse and delivers that pulse to the write address counter 25 as a load pulse in order to load the start address latched in the register 31 into the write address counter 25. The match pulse delivered from the comparator 33 is also applied to the read address counter 26 as a clear pulse and further supplied to a sequencer 34 which switches the selectors 20, 23, 27 and 28 as required to control the writing and reading modes of the memories 21 and 22.

As shown in FIG. 3, according to the present invention, the horizontal sync signal appears randomly, i.e., the interval of the horizontal sync signals is not periodic. A horizontal sync separator 35 provides the horizontal sync signal. In a burst controlled oscillator 36, the burst signal is extracted in accordance with the separated horizontal sync signal and a clock pulse of 14.3 MHz is generated in synchronism with the extracted burst signal. In FIG. 5, a self clear pulse is delivered from the read address counter 26 and used for a reference horizontal signal, with a periodic interval, in the random data generator 29. A vertical sync separator 37 separates the vertical horizontal sync signal, which appears periodically in the input scrambled television signal.

Figure 6:
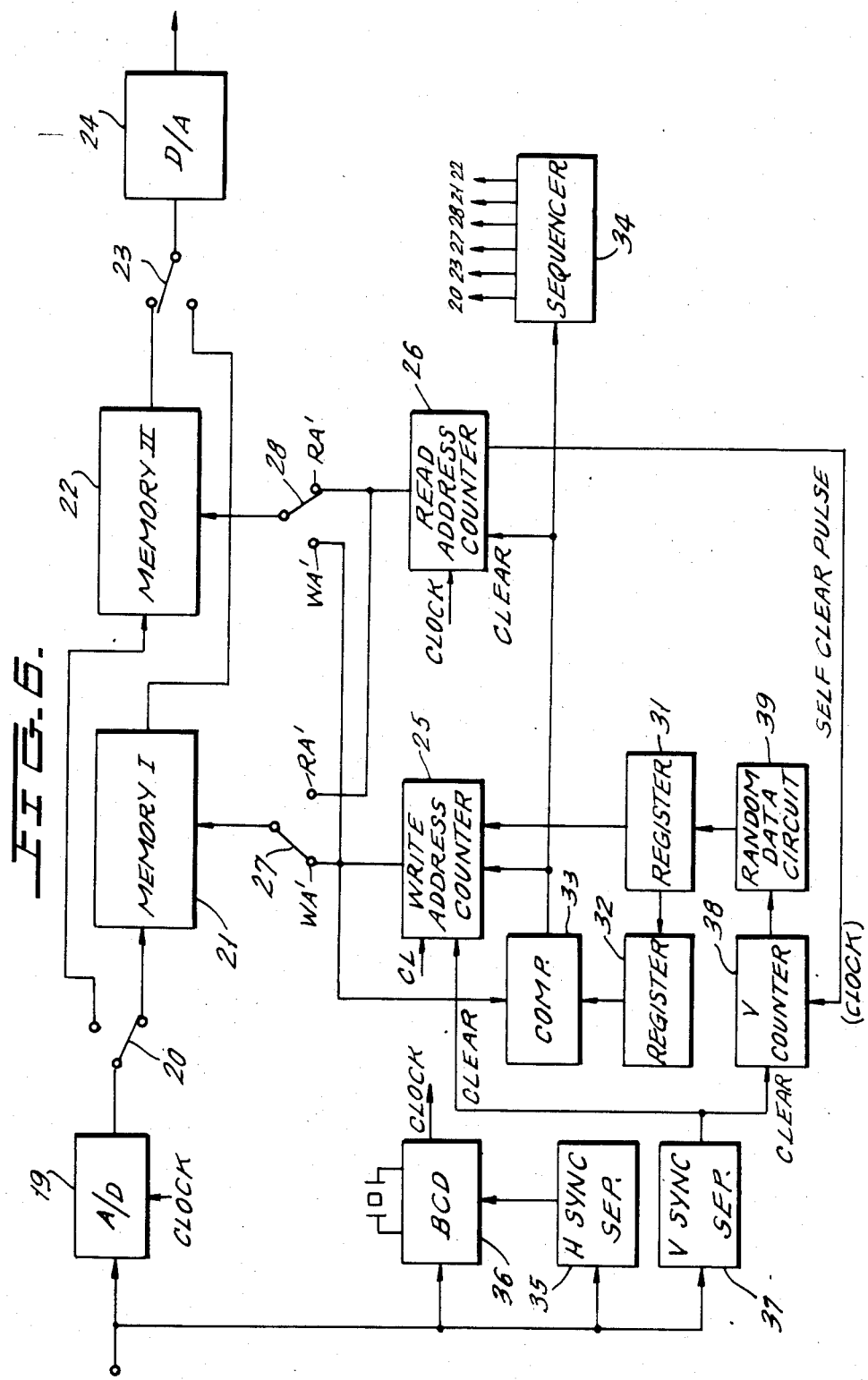
FIG. 6 shows a block diagram of another embodiment of the receiver side.

FIG. 6 shows another embodiment of the receiver according to the present invention. In FIG. 6, a vertical counter 38 counts the number of lines from the vertical blanking period, i.e., it tracks the line numbers of each line number. The self clear pulse from the read address counter 26 is supplied to the vertical counter 38 and functions as a clock signal. A random data generator 39 produces series of start addresses for line rotation scrambling in accordance with the counted value of the vertical counter 38. In this case, the series of start addresses is previously predetermined in both the transmitting and receiving ends.

FIG. 7 shows a modification of the embodiment shown in FIG. 6. Thus, different aspects thereof will be explained below. In FIG. 7, a counter circuit 40 starts to count the clock pulse from a leading edge of the horizontal sync pulse provided by a horizontal sync separator 35', and delivers a pulse when the counted value reaches the start address contained in the register 32. In this modification, the in regularly appearing horizontal sync signal contained in the input scrambled television signal is directly used for restoring operation. Namely, with the counter circuit 40, the random horizontal sync interval of the input scrambled television signal is corrected. In other words, since the phase of the segmented point in the transmitter is considered to be advanced from the normal phase of the unscrambled signal by the start address, the restoring operation is performed in that the phase of the separated horizontal sync pulse is delayed by the start address in the receiver. Therefore, the output pulse from the counter circuit 40 is employed as a timing which indicates the accomplishment of writing, and supplied to the write address counter 25, the read address counter 26 and the sequencer 34 as shown in FIG. 7.

As described above, according to the present invention, the effective scrambling is obtained by scrambling the video signal over an interval which includes horizontal sync signal.

While the invention was described with reference to preferred embodiments thereof, many variations and modifications will now become apparent to those skilled in the art. It is preferred, therefore, that the invention be limited not by the foregoing description but only in accordance with the claims.

What is claimed is:

1. An apparatus for scrambling a television signal, comprising:
   means for dividing each horizontal line including a sync signal thereof of said television signal into two parts at a segment point located on said horizontal line;
   means for exchanging said two parts, said exchanging means including means for transmitting said segment point at the leading and trailing edges of a scrambled horizontal line; and
   means for changing the location of said segment point in each consecutive horizontal line whereby the intervals between the horizontal sync signals in the scrambled television signal vary irregularly in accordance with the location of said segment point.

2. An apparatus for scrambling an input television signal comprising:
   first and second memories each having a capacity sufficient to store therein one horizontal period of said television signal including a sync signal thereof;
   means for producing write addresses for storing each consecutive horizontal period of said input television signal alternatively into said first and second memories;
   means for selecting a segment position in each horizontal period, said segment position being different in consecutive horizontal periods; and
   means responsive to said segment position for producing read addresses which are applied alternatively to said first and second memories to read out said television signal from said memories, said read addresses starting with an address corresponding to said segment position passing through addresses substantially corresponding to the addresses which follow and then which precede said segment position and terminating in an address corresponding to said segment position, whereby horizontal sync signals in a scrambled television signal occur irregularly.

3. An apparatus for restoring the order of a scrambled television signal which has been scrambled by reversing the order to transmission of first and second portions of each horizontal lines of said television signal, said first and second portions being divided by an intermediate picture element whose position changes in successive horizontal lines, said apparatus comprising:
   first and second memories each having a capacity sufficient for storing therein one horizontal period including a sync signal of said television signal;
   means for producing write addresses and alternatively supplying said write addresses to said first and second memories, said write addresses having an order such that said second portion is stored in a respective second area of said memories and said first portion is stored in a respective first area of said memories; and
   means for producing read addresses and alternatively supplying said read addresses to said first and second memories for reading out said television signal in an order which restores said scrambled television signal into a viewable form, said means for producing said write and read addresses being controlled to access said memories so that when a given horizontal period is stored in one memory, another horizontal period is read out from the other of said first and second memories.

4. An apparatus for scrambling a television signal having a plurality of horizontal scan lines, each line including a sync signal followed by a plurality of picture elements and terminating with a last picture element, said apparatus comprising:
   means for selecting an intermediate picture element of said horizontal scan line, said intermediate picture element dividing said horizontal scan line into first and second portions, said first portion including said sync signal and picture elements located between said sync signal and said intermediate picture element, said second portion including picture elements which are located after said intermediate picture element and terminate with said last picture element;

means for transmitting said horizontal scan line according to an order wherein said intermediate picture element is transmitted first followed by said second portion, followed by said first portion and terminating with a second transmission of said intermediate picture element; and means for changing the location of said intermediate picture element in successive horizontal scan lines of said television signal, whereby the period between two adjacent horizontal sync signals in a scrambled television signal irregularly varies in accordance with the position of said intermediate picture element.

5. The apparatus of claim 4, wherein said apparatus include an analog to digital converter for converting said television signal into a plurality of digital values prior to the scrambling thereof and random generator means for selecting the location of the intermediate picture element of each horizontal line, said random generator means including a plurality of different sets of memory locations, each set of memory locations defining the position of the intermediate picture element in each line of a given television field, a given set being selected randomly from said plurality of sets at the beginning of each television field.

6. The apparatus of claim 5, further comprising register means for receiving from said random generator means an address value corresponding to the position of said intermediate picture element and comparator means responsive to said register means for detecting the occurrence of said address and for producing a match pulse for indicating the end of transmission of a given horizontal line and for storing a next address of an intermediate picture element of a subsequent horizontal line.

7. The apparatus of claim 6, wherein said analog to digital converter samples said television input at a rate which is four times the frequency of the color burst signal of said television signal.

8. The apparatus of claim 5, wherein a picture element of said television signal which next precedes said intermediate picture element is excluded from said scrambled television signal.

9. The apparatus of claim 7, further comprising means for transmitting at a leading end of each television field of said scrambled television signal a data portion which indicates which set of said plurality of different sets of memory locations will be used for scrambling the following television field.

10. The apparatus of claim 3, further including random data generator means which includes a memory for specifying the successive position of said intermediate picture element in each horizontal line and means responsive to said random data generator means for controlling said write addresses producing means to produce said write addresses to have a start address in each horizontal period which corresponds to the position to a respective one of said intermediate picture elements.

11. The apparatus of claim 10, wherein said scrambled television signal includes a leading data portion which identifies a set of intermediate picture element addresses for a given television field, said random data generator being responsive to said leading data portion to retreive a set of intermediate picture element addresses which corresponds to said television field.

* * * * *